(12) United States Patent
Buratto et al.

(10) Patent No.: US 12,370,882 B2
(45) Date of Patent: Jul. 29, 2025

(54) BREATHER VENT FOR HYDRAULIC TANK

(71) Applicant: Donaldson Company, Inc., Bloomington, MN (US)

(72) Inventors: Fabrizio Buratto, Sustinente (IT); Larry E. Gerken, Bowling Green, OH (US); Isacco Pavanelli, Sermide e Felonica (IT)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 18/275,471

(22) PCT Filed: Feb. 2, 2022

(86) PCT No.: PCT/US2022/014849
§ 371 (c)(1),
(2) Date: Aug. 2, 2023

(87) PCT Pub. No.: WO2022/169806
PCT Pub. Date: Aug. 11, 2022

(65) Prior Publication Data
US 2024/0308330 A1    Sep. 19, 2024

Related U.S. Application Data

(60) Provisional application No. 63/146,223, filed on Feb. 5, 2021.

(51) Int. Cl.
*B60K 15/035* (2006.01)
*F16K 17/196* (2006.01)

(52) U.S. Cl.
CPC ...... *B60K 15/03519* (2013.01); *F16K 17/196* (2013.01); *B60K 2015/03547* (2013.01)

(58) Field of Classification Search
CPC ...... F16K 17/19–196; B60K 15/03519; B60K 2015/03547
See application file for complete search history.

(56) References Cited

U.S. PATENT DOCUMENTS 3,785,401 A * 1/1974 Button .................. F16K 17/19
                                                        137/493.2
3,968,897 A * 7/1976 Rodgers ............... F16K 15/148
                                                        137/854

(Continued)

FOREIGN PATENT DOCUMENTS

DE    102011015925 A1    10/2012
WO    2016054409 A1      4/2016

(Continued)

OTHER PUBLICATIONS

"Donaldson Hydraulic Filtration Overview," uploaded on Nov. 17, 2011 by user "Donaldson Company," Retrieved from the Internet: <URL:https://www.youtube.com/watch?v=DouGwx_ia30>, 1 page.

(Continued)

*Primary Examiner* — Jessica Cahill
(74) *Attorney, Agent, or Firm* — Mueting Raasch Group

(57) ABSTRACT

A vent having a vent housing defining a mounting structure, a first opening between a first end and a second end of the vent housing, a first airflow pathway from the first opening, a second airflow pathway from a second opening, and a draining pathway from the first airflow pathway through the first end of the vent housing. The first airflow pathway has a first segment and a second segment extending in opposite axial directions. An inlet relief valve and an outlet relief valve are arranged in parallel between the first and second airflow pathways. The inlet relief valve opens upon exceeding a first threshold pressure differential of the second relative to the first airflow pathway. The outlet relief valve opens upon exceeding a second pressure differential of the (Continued)

first relative to the second airflow pathway. A filter assembly is disposed in the vent housing across the second airflow pathway.

20 Claims, 11 Drawing Sheets

(56) References Cited

U.S. PATENT DOCUMENTS

| | | | |
|---|---|---|---|
| 5,522,417 A | 6/1996 | Tomioka et al. | |
| 5,575,832 A | 11/1996 | Boyd | |
| 5,676,345 A | 10/1997 | Zurke et al. | |
| 5,752,746 A | 5/1998 | Perry | |
| 5,860,708 A * | 1/1999 | Borders | B60B 7/00 |
| | | | 301/108.4 |
| 7,320,314 B2 * | 1/2008 | Kashima | F02M 37/0082 |
| | | | 123/519 |
| 8,746,485 B1 * | 6/2014 | Tiefenthaler | B60K 15/0406 |
| | | | 220/255 |
| 9,096,124 B2 * | 8/2015 | Whelan | B60K 15/0406 |
| 9,732,649 B2 * | 8/2017 | Hiltzik | F02M 25/0872 |
| 2008/0251138 A1 * | 10/2008 | Wang | F16K 17/196 |
| | | | 137/493 |
| 2011/0180466 A1 | 7/2011 | Kalauch | |
| 2016/0169068 A1 | 6/2016 | Johnson | |
| 2017/0304765 A1 * | 10/2017 | Chou | B60K 15/0406 |
| 2020/0061506 A1 | 2/2020 | Lees et al. | |

FOREIGN PATENT DOCUMENTS

| | | |
|---|---|---|
| WO | 2016123354 A1 | 8/2016 |
| WO | 2017147004 A1 | 8/2017 |
| WO | 2022169806 A1 | 8/2022 |

OTHER PUBLICATIONS

"Hydraulic Oil Reservoir—T.R.A.P. Breathers," uploaded on Oct. 20, 2021 by user "Donaldson Engine," Retrieved from the Internet: <URLhttps://www.youtube.com/watch?v=NI578h9CDqk>, 2 pages.

International Search Report and Written Opinion in PCT/US2022/014849, mailed May 9, 2022, 10 pages.

International Preliminary Report on Patentability in PCT/US2022/014849, mailed Aug. 3, 2023, 8 pages.

"Hy-Pro Filtration", Brochure, Donaldson Company, Inc., May 2019, 40 pages.

"Set a Speed T.R.A.P. for Water and Dirt", Brochure No. HYD-206, Donaldson Company, Inc., Industrial Hydraulics, 2005, 4 pages.

"BT Breathers with T.R.A.P. Technology: Self-Regenerating Moisture and Particulate Breathers", Hy-Pro Corporation, available on or before Feb. 3, 2021, 4 pages.

"T.R.A.P. Breather Technology: Moisture Meets Its March", Donaldson Company, Inc., Mar. 2016, 5 pages.

Hydraulic Filtration Product Guide, Donaldson Company, Inc., Donaldson Filtration Solutions, Catalogue No. F116023, Dec. 2014, pp. 51-53.

Hydraulic Filtration Product Guide, Donaldson Company, Inc., Donaldson Filtration Solutions, Catalogue No. F116023, Dec. 2014, p. 150.

Hydraulic Filtration Product Guide, Donaldson Company, Inc., Donaldson Filtration Solutions, Catalogue No. F116023, Dec. 2014, p. 156.

Product Profile "T.R.A.P. Breather with Anti-Rollover Valve", Donaldson Filtration Solutions, Product Profile No. 13EPP002, May 2013, 1 page.

* cited by examiner

BREATHER VENT FOR HYDRAULIC TANK

CROSS REFERENCE TO RELATED APPLICATIONS

This application is the § 371 U.S. National Stage of International Application No. PCT/US2022/014849, filed 2 Feb. 2022, which claims the benefit of U.S. Provisional Application No. 63/146,223, filed 5 Feb. 2021, the disclosures of which are incorporated by reference herein in their entireties.

TECHNOLOGICAL FIELD

The present disclosure is generally related to a breather vent. More particularly, the present disclosure is related to a breather vent for a hydraulic tank.

SUMMARY

Some embodiments of the technology disclosed herein relates to a vent having a vent housing defining a mounting structure, a first end, a second end, a first opening between the first end and the second end, a first airflow pathway extending from the first opening, a second opening, a second airflow pathway extending from the second opening, and a draining pathway extending from the first airflow pathway through the first end of the vent housing. The first airflow pathway has a first segment extending in a first axial direction and a second segment extending in an opposite axial direction from the first axial direction. An inlet relief valve is coupled to the housing between the first airflow pathway and the second airflow pathway. The inlet relief valve is biased in a closed position and is configured to open upon a pressure differential of the second airflow pathway relative to the first airflow pathway exceeding a first threshold pressure. An outlet relief valve is coupled to the housing between the first airflow pathway and the second airflow pathway. The outlet relief valve is biased in a closed position. The outlet relief valve is arranged in parallel with the inlet relief valve. The outlet relief valve is configured to open upon a pressure differential of the first airflow pathway relative to the second airflow pathway exceeding a second threshold pressure. A filter assembly is disposed in the vent housing. The filter assembly extends across the second airflow pathway.

In some such embodiments, the mounting structure defines a bayonet coupler that is configured to couple to a mating bayonet connector. Additionally or alternatively, the vent housing defines a first end and a second end, where the filter assembly is towards the second end. Additionally or alternatively, the inlet relief valve and the outlet relief valve are integrated in a single component. Additionally or alternatively, the inlet relief valve is an elastomeric cross-slit valve. Additionally or alternatively, the inlet relief valve comprises an elastomeric valve having a displaceable sealing lip sealably surrounding an inlet opening. Additionally or alternatively, the outlet relief valve has a plug sealably disposed across an outlet opening and a spring compressibly disposed between the plug and the vent housing, where the plug is translatable away from the outlet opening. Additionally or alternatively, the outlet opening surrounds the inlet opening. Additionally or alternatively, the inlet relief valve is directly coupled to the outlet relief valve.

Additionally or alternatively, the vent has a filter casing surrounding the filter assembly, the filter casing having an outer cap and an inner cap, where the outer cap and the inner cap are secured around the filter assembly. Additionally or alternatively, the outer cap defines the mounting structure. Additionally or alternatively, the outer cap and the inner cap form a snap fit connection around the filter assembly. Additionally or alternatively, the second opening is defined between the outer cap and the inner cap. Additionally or alternatively, the inlet relief valve and the outlet relief valve are disposed between the inner cap and the outer cap.

Additionally or alternatively, the inner cap defines the first opening and the first airflow pathway. Additionally or alternatively, the first airflow pathway defines a tortuous path from the first opening towards the inlet relief valve. Additionally or alternatively, the filter assembly has first filter media surrounding a central opening and the inlet relief valve and the outlet relief valve are disposed in the central opening. Additionally or alternatively, the first filter media has pleated filter media having first pleat folds abutting the central opening and second pleat folds radially outward from the first pleat folds. Additionally or alternatively, the vent has a second filter media surrounding the first filter media, wherein the first filter media and the second filter media are arranged in a series in the second airflow pathway. Additionally or alternatively, the vent is configured to be sealably received by a hydraulic tank about a fill port.

Some embodiments of the current technology relate to a vent system. The vent system has a vent consistent with any of those described above. The system has a tank interface having a vent mount configured to be fixed to a liquid tank. The vent mount defines a mount opening, and the vent mount has a mating structure configured to sealably mate with the mounting structure of the vent around the housing.

In some such embodiments, the system has a strainer disposed in the mount opening, where the strainer is configured to extend from the vent mount into the liquid tank in the axial direction, and the strainer is configured to receive the first end of the vent. Additionally or alternatively, the mating structure has a bayonet connector. Additionally or alternatively, the mating structure has a vent sealing surface. Additionally or alternatively, the vent mount further has a plurality of radially extending deflectors that are configured to partially obstruct the second airflow pathway. Additionally or alternatively, the radially extending deflectors extend radially outward from an outer radial surface of the vent mount.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The technology disclosed herein is generally related to a liquid tank vent. The liquid tank can be a hydraulic fluid tank, in various implementations. The liquid tank vent combines a variety of features that improves its functionality compared to existing liquid tank vents. The liquid tank vent may incorporate filter media to advantageously prevent the ingress of water into the liquid tank and remove moisture from the liquid tank. Furthermore, the liquid tank vent may have filter media to filter particulates from the air entering the liquid tank. The liquid tank vent may incorporate features that provide splash protection outside the liquid tank, inside the liquid tank, or both outside the liquid tank and inside the liquid tank. The liquid tank vent may define a draining pathway that advantageously returns stored liquid that splashes onto the tank vent back to the tank. The liquid tank vent may advantageously prevent the release of stored liquid to the environment outside of the tank vent. These and other advantages may result from designs consistent with the present disclosure.

Figure 1:
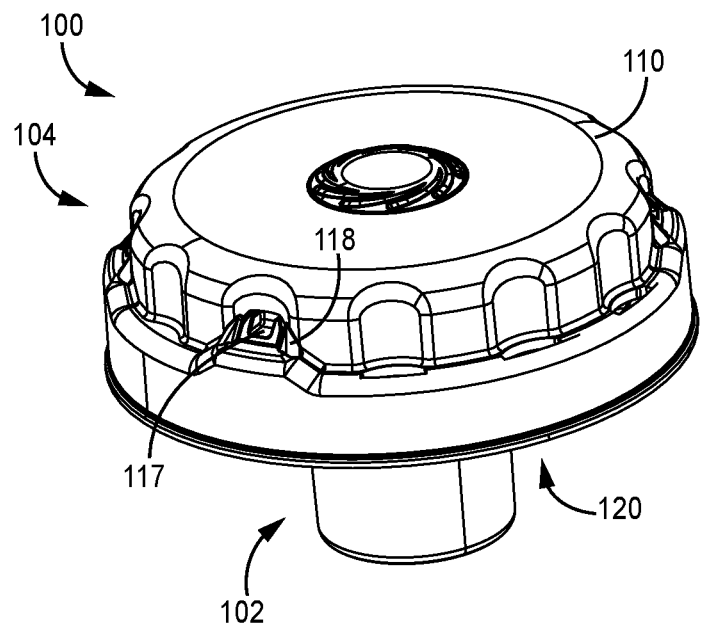
FIG. 1 is a first perspective view of an example vent.
Figure 2:
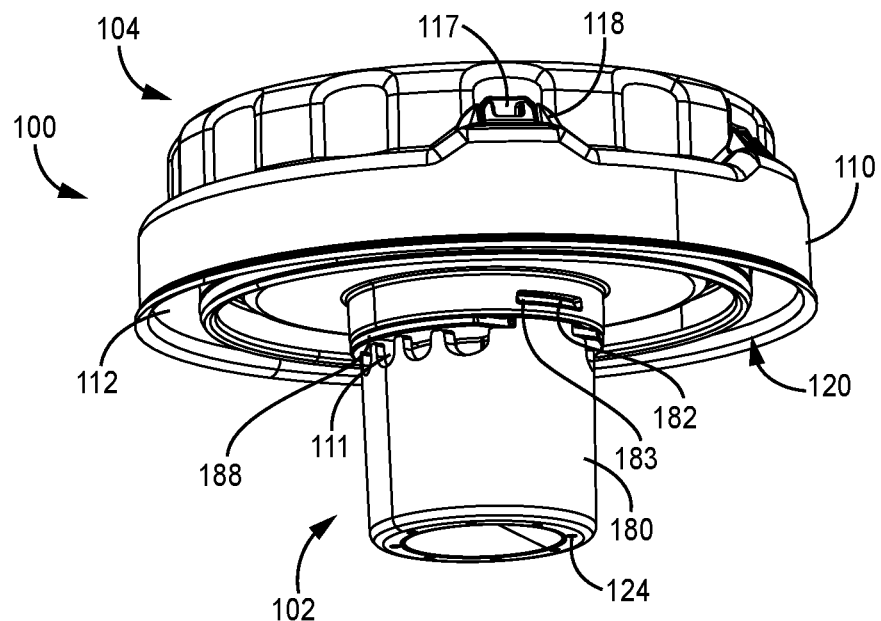
FIG. 2 is a second perspective view of the example vent.
Figure 3:
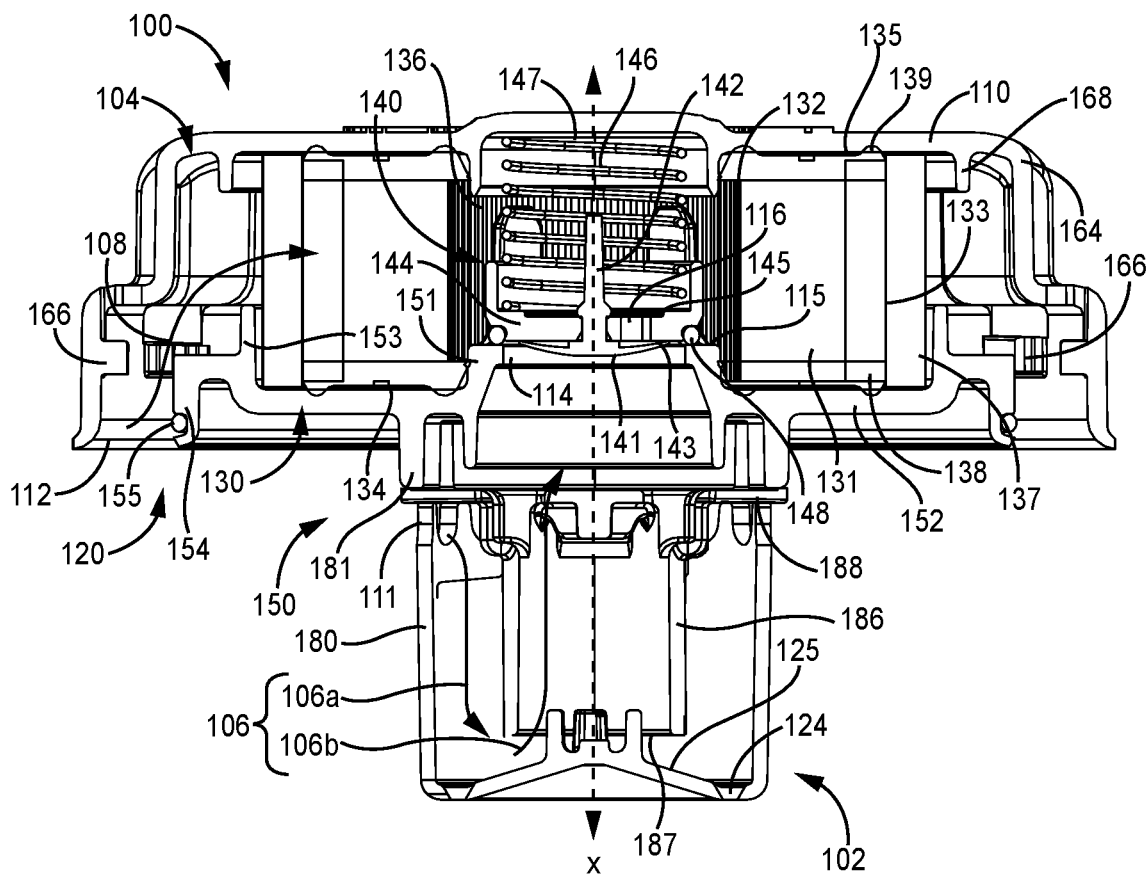
FIG. 3 is a cross sectional view of an example vent consistent with FIGS. 1 and 2.

FIG. 1 depicts a first perspective view of an example vent 100 consistent with some embodiments. FIG. 2 depicts a second perspective view of the example vent 100 and FIG. 3 depicts an example cross-sectional view of the vent of FIGS. 1 and 2. The vent 100 is generally configured to sealably couple to a liquid tank of a system to allow two-way air venting of the liquid tank and prevent the ingress of contaminants such as particles and liquids to the tank. The vent 100 can be configured to sealably couple to a liquid tank where the volume of liquid within the liquid tank fluctuates over the course of normal operations of the system. In some implementations the vent 100 is configured to accommodate airflow into the liquid tank upon a threshold vacuum between the interior of the liquid tank and the external environment. In some implementations the vent 100 is configured to accommodate airflow out of the liquid tank upon a threshold pressure between the interior of the liquid tank and the external environment. The vent 100 can be configured to filter the air passing between the tank and the external environment. In some embodiments, the vent 100 is configured to remove water vapor from the liquid tank. In various embodiments the vent 100 is configured to prevent liquid from the liquid tank from leaking into the external environment.

The vent 100 generally has a vent housing 110, an inlet relief valve 142, an outlet relief valve 140, and a filter assembly 130. The vent housing 110 is generally configured to house various components of the vent and direct airflow through the vent housing 110. The housing can be constructed of a variety of materials and combinations of materials such as polymers or metals, as will be appreciated by those having skill in the art.

The vent housing 110 defines a first end, a second axial end 104, a first opening 111, a second opening 112, and a mounting structure 120. The vent housing 110 has a mounting structure 120 that is configured to be installed on a liquid tank. The mounting structure 120 of the vent is generally configured to sealably couple to a liquid tank about an opening defined in the liquid tank. The vent can be configured to be sealably received by a hydraulic tank about a fill port. The mounting structure 120 is configured to create a seal between the first opening 111 and the second opening 112 in the environment outside of the vent. Upon installation on a liquid tank, a first axial end 102 of the vent housing 110 can generally be configured to be positioned inside of the liquid tank. In various embodiments the second axial end 104 of the vent housing 110 is configured to be positioned outside the liquid tank. In the current example, the mounting structure 120 includes a seal 155 disposed on a sealing flange 154 of the housing 110 and a bayonet coupler 166 that is configured to couple to a mating bayonet connector, which will be described in more detail below. The seal 155 is disposed between the first opening 111 and the second opening 112 in the axial direction, the lateral direction, or both in the axial direction and lateral direction, where "lateral" is used herein as meaning perpendicular to the axial direction.

The first opening 111 is positioned between the first axial end 102 and the second axial end 104. The vent housing 110 defines a first airflow pathway 106 extending from the first opening 111. The vent housing 110 defines a second airflow pathway 108 extending from the second opening 112. The vent housing 110 of the vent is generally configured to accommodate airflow between the interior of a tank (to which the vent is coupled) and the external environment through the first opening 111, second opening 112, first airflow pathway 106 and the second airflow pathway 108. The first airflow pathway 106 is configured for direct communication with the interior of a tank and a second airflow pathway 108 is configured for direct communication with the external environment.

The vent has two oppositely-functioning relief valves that are each coupled to the vent housing 110. The relief valves are arranged in parallel between the first airflow pathway 106 and the second airflow pathway 108. Each of the relief valves are biased to a closed position where the first airflow pathway 106 and the second airflow pathway 108 are separated from each other within the vent housing 110. The relief valves include an inlet relief valve 142 and an outlet relief valve 140. The inlet relief valve 142 is coupled to the vent housing 110 between the first airflow pathway 106 and the second airflow pathway 108. The inlet relief valve 142 is generally biased in a closed position but is configured to open upon a pressure differential of the second airflow pathway 108 relative to the first airflow pathway 106 that exceeds a first threshold pressure. In other words, when the vent 100 is installed in a tank, the inlet relief valve 142 is configured to open upon a threshold partial vacuum in the tank relative to the external environment.

The outlet relief valve 140 is also coupled to the vent housing 110 between the first airflow pathway 106 and the second airflow pathway 108. The outlet relief valve 140 is biased in a closed position and is configured to open upon a pressure differential of the first airflow pathway 106 relative to the second airflow pathway 108 exceeds a second threshold pressure. In other words, when the vent 100 is installed in a liquid tank, the outlet relief valve 140 is configured to open when there is a threshold partial vacuum in the external environment relative to inside of the tank.

The outlet relief valve 140 is arranged in parallel with the inlet relief valve 142 between the first airflow pathway 106 and the second airflow pathway 108. The inlet relief valve 142 and the outlet relief valve 140 can have a variety of configurations consistent with the technology disclosed herein. In the current example, the vent housing 110 defines a valve opening 114 between the first airflow pathway 106 and the second airflow pathway 108. The inlet relief valve 142 and the outlet relief valve 140 cumulatively extend across the valve opening 114 in a parallel arrangement. More particularly, the outlet relief valve 140 extends across an outlet opening 114 (that, in the current embodiment is the same opening as the valve opening 114) and forms a seal with the vent housing 110 about the outlet opening 114. The inlet relief valve 142 extends across an inlet opening 116 and forms a seal about the inlet opening 116. In the current example, the outlet opening 114 and the valve opening 114 are co-extensive. The outlet relief valve 140 defines the inlet opening 116 such that the inlet opening 116 is within the valve opening 114. As such, the outlet opening 114 (and the valve opening 114) surrounds the inlet opening 116. The inlet relief valve 142 extends across the inlet opening 116 and forms a seal with the outlet relief valve 140 about the inlet opening 116. As such, in the current example, the inlet relief valve 142 is directly coupled to the outlet relief valve 140.

In some other embodiments, the inlet relief valve 142 and the outlet relief valve 140 are each directly coupled to the housing. Such a configuration may be employed where the vent housing 110 defines a valve opening 114 that includes an outlet opening 114 and an inlet opening 116 that are discrete, separate openings. In some such embodiments the inlet relief valve 142 and the outlet relief valve 140 extend across the inlet opening 116 and the outlet opening 114, respectively, and the inlet relief valve 142 and the outlet relief valve 140 do not make direct contact.

In the current example, the inlet relief valve 142 is an elastomeric valve. In particular, the inlet valve has a displaceable sealing lip 143 that forms a seal around the inlet opening 116. The sealing lip 143 is configured to obstruct the inlet opening 116 under the first threshold pressure differential between the second airflow pathway 108 and the first airflow pathway 106. The sealing lip 143 is configured to clear the inlet opening 116 over the first threshold pressure differential between the second airflow pathway 108 and the first airflow pathway 106. In particular, the sealing lip 143 is in direct contact with the first airflow pathway 106 and the second airflow pathway 108 such that, upon the first threshold pressure differential, the pressure in the second airflow pathway 108 pushes against the sealing lip 143 to flex at least a portion of the sealing lip 143 away from the inlet opening 116. In the current example, the sealing lip 143 is defined by an umbrella-shaped portion that extends across the inlet opening 116. Such a configuration can advantageously obstruct liquids from passing through the inlet opening 116 towards the filter assembly 130, such as when a liquid contained in a liquid tank would splash upwards towards the inlet valve.

While in the current example, the displaceable sealing lip 143 sealably surrounds the inlet opening 116, other configurations are also contemplated. For example, the inlet valve can have a duckbill or slit configuration, for example, where mating displaceable sealing lips are in sealing contact across the inlet opening 116 and are configured to separate under the first threshold pressure differential between the second airflow pathway 108 and the first airflow pathway 106. In some other embodiments the inlet-relief valve is translatable plug sealably disposed across the inlet opening 116. In such an example, a portion of the inlet relief valve 142 can be configured to translate away from the inlet opening 116 upon the first threshold pressure differential.

In the current example, the outlet relief valve 140 is configured as a plug 144 sealably disposed across the outlet opening 114. The vent housing 110 defines a valve seat 115 surrounding the outlet opening 114, and the outlet relief valve 140 is configured to be biased in a position against the valve seat 115. A spring 146 is compressibly disposed between the plug 144 and the vent housing 110. The spring 146 has a first end 145 coupled to the plug 144 and a second end 147 coupled to the vent housing 110. The spring 146 exerts a force that biases the plug 144 in sealing contact with the valve seat 115 about the outlet opening 114. The plug 144 is translatable away from the outlet opening 114. The plug 144 is translatable away from the outlet opening 114 in a direction opposing the biasing force of the spring 146. In particular, the plug 144 is in direct contact with the first airflow pathway 106 and the second airflow pathway 108 such that, upon the second threshold pressure differential, the pressure in the first airflow pathway 106 pushes against the plug 144 and the spring 146 to translate at least a portion of the plug 144 away from the outlet opening 114.

Figure 4:
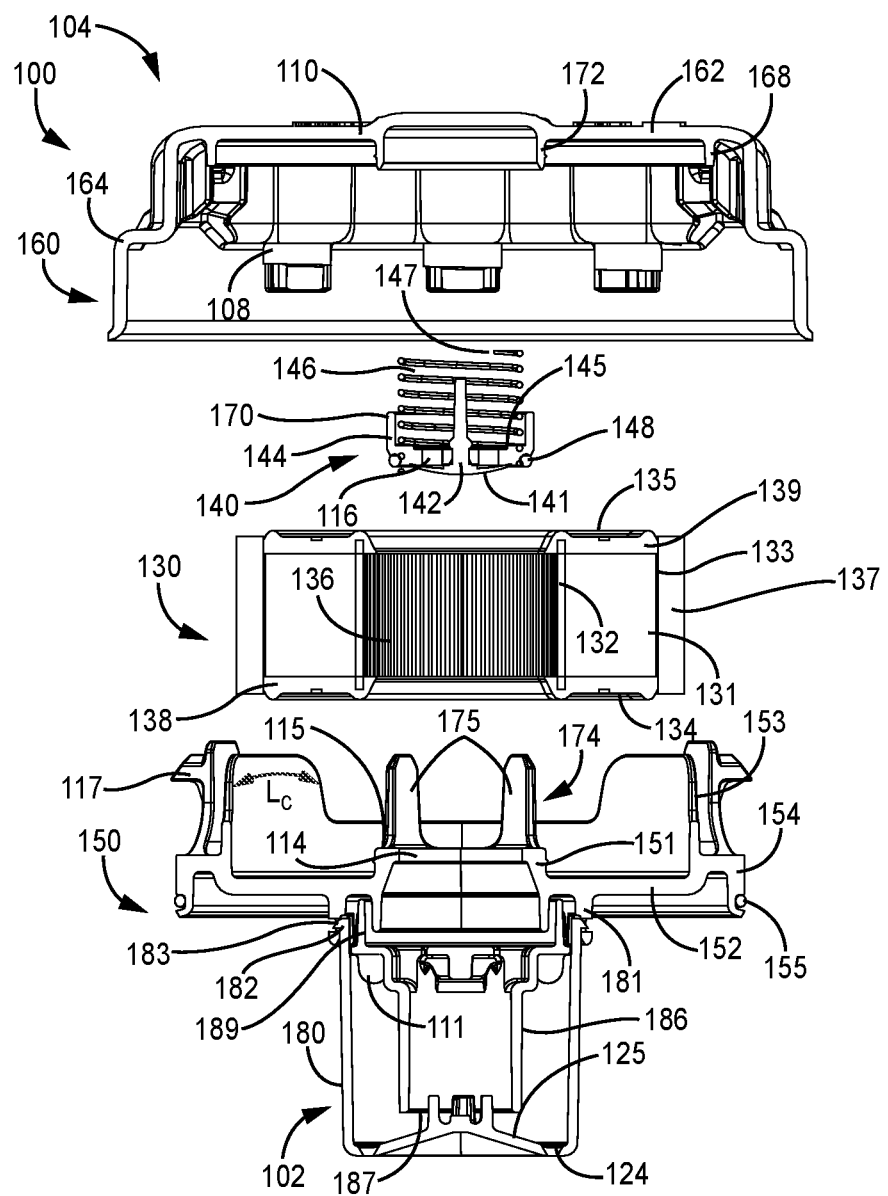
FIG. 4 is a cross-sectional exploded view of an example vent of FIG. 3.

In various embodiments, the outlet relief valve 140 is advantageously configured to prevent lateral displacement of portions of the spring 146. Lateral displacement of portions of the spring may prevent predictable re-seating of the outlet relief valve 140 on the valve seat 115 if spring expansion forces are shifted away from the axial direction. Referring to FIG. 4, which is an exploded view of the example vent, in the current example, the outlet relief valve 140 has a first spring guide 170 that is configured to receive the first end 145 of the spring 146. In particular, the first spring guide 170 surrounds the spring 146 and is configured to maintain the spring 146 in axial alignment. The first spring guide 170 extends outwardly from the valve sealing surface 148 in the axial direction towards the second end 147 of the spring 146. The first spring guide 170 has an inner lateral dimension (such as an inner diameter) that is slightly greater than the outer lateral dimension of the spring 146. In the current example, the first spring guide 170 is continuous around the first end 145 of the spring 146, but in some other embodiments the first spring guide 170 can a plurality of individual axial extensions that cumulatively surround the first end 145 of the spring 146.

Furthermore, in the current embodiment, the vent housing 110 has a second spring guide 172 that is configured to receive the second end 147 of the spring 146. In particular, the second spring guide 172 surrounds the spring 146 and is configured to maintain the spring 146 in axial alignment.

The second spring guide 172 extends outwardly from an inner lateral surface of the second axial end 104 of the vent housing 110 in the axial direction towards the first end 145 of the spring 146. The second spring guide 172 has an inner lateral dimension (such as an inner diameter) that is slightly greater than the outer lateral dimension of the spring 146. In the current example, the second spring guide 172 is continuous around the second end 147 of the spring 146, but in some other embodiments the second spring guide 172 can a plurality of individual axial extensions that cumulatively surround the second end 147 of the spring 146. While in the current example, the second spring guide 172 is integral with the second axial end 104 of the vent housing 110, in some other embodiments, the second spring guide 172 can be a separate component that is coupled to the second axial end 104 of the vent housing 110.

In some embodiments the combined axial length of the first spring guide 170 and the second spring guide 172 is less than the axial length of the spring under maximum compression under normal operating conditions. In some embodiments the combined axial length of the first spring guide 170 and the second spring guide 172 is more than 40%, or more than 50% of the axial length of the spring 146 when the spring 146 is in a fully expanded state where the plug 144 is properly seated on the valve seat 115.

In various embodiments, the vent 100 is advantageously configured to prevent lateral displacement of the plug 144 of the outlet relief valve 140. Lateral displacement of the plug 144 may prevent its proper seating on the valve seat 115 to seal the outlet opening 114. As such, in the current example, the vent housing 110 has a valve guide 174 that defines a linear translation pathway for the plug 144. In particular, the valve guide 174 surrounds the plug 144 and, in particular, the valve sealing surface 148 of the plug, and is configured to maintain the plug along an axial linear translation pathway. The valve guide 174 extends outwardly from the valve seat 115 in the axial direction towards the second end 147 of the spring 146. The valve guide 174 has an inner lateral dimension (such as an inner diameter) that is slightly greater than the outer lateral dimension of the plug 144. In the current example, the valve guide 174 is a plurality of individual axial extensions 175 that cumulatively surround the plug 144, but in some other embodiments the valve guide 174 can be continuous around the plug 144. The valve guide 174 can have an axial length that is greater than or equal to the maximum expected translation of the plug 144 away from the valve seat 115. While in the current example, the valve guide 174 can be integral with the vent housing 110 and the valve seat 115, in some other embodiments the valve guide 174 can be a separate component that is coupled to the vent housing 110, such as coupled to the valve seat 115.

Figure 13:
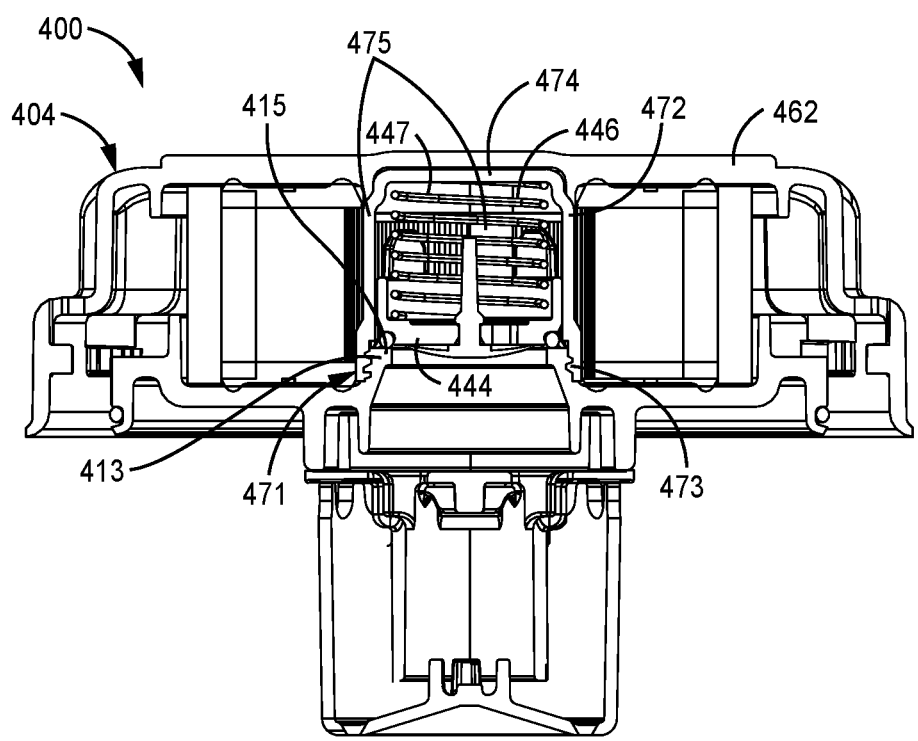
FIG. 13 shows an alternate example of a vent consistent with the technology disclosed herein.

FIG. 13 shows an alternate example of a vent 400 consistent with the technology disclosed herein. The vent 400 is generally consistent with the descriptions of FIGS. 1-4 except where contradictory to the current figure and description. In this example, the functions and structures of the valve guide 174 and the second spring guide 172 discussed above and shown in FIG. 4 are integrated in a single component that is referred to as a valve cage 472. The valve cage 472 has a first end 471 defining a coupling structure 473 that is configured to couple to the vent housing 410 around the valve seat 415. In particular, the coupling structure 473 is inner circumferential threads 473 that mate with outer circumferential threads 413 defined around the valve seat 415. Other types of coupling structures can alternatively be used such as an interference fit, bayonet connection, and so on. The valve cage 472 has a second end 474 that is positioned between the lateral sidewall 462 on the second end 404 of the housing 110 and the second end 447 of the spring 446. The valve cage 472 has a plurality of axial extensions 475 that are positioned circumferentially around the spring 446. Each of the axial extensions 475 extend from the first end 471 to the second end 474 of the valve cage 472. The valve cage 472 defines a linear translation pathway for the plug 444 in the axial direction. The valve cage 472 helps to retain the spring 446 in axial alignment.

Figure 5:
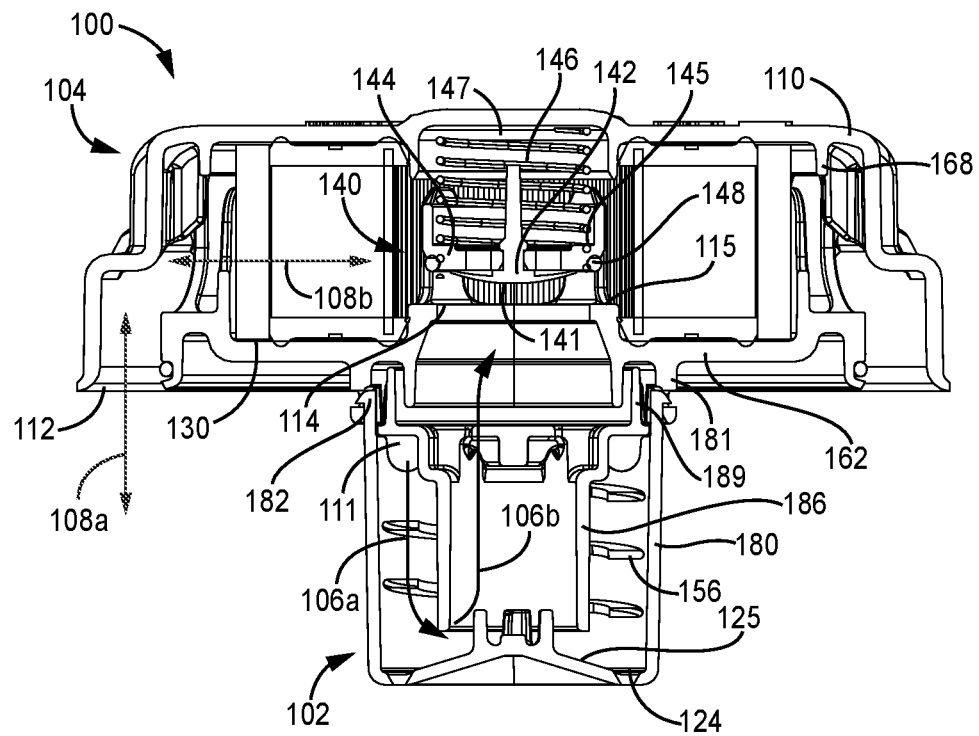
FIG. 5 is another cross-sectional view of an example vent generally consistent with FIG. 3.

FIG. 5 depicts an example vent 100 consistent with the examples depicted in FIGS. 1-4 with the plug 144 away from the outlet opening 114. The plug 144 is translatably disposed in the second airflow pathway 108 but defines a facing surface 141 that is in fluid communication with the first airflow pathway 106. As such, the pressure in the first airflow pathway 106 is exerted on the facing surface 141 against the combined force of the spring 146 and the pressure in the second airflow pathway 108.

It is noted that, in the current example, the facing surface 141 of the plug 144 of the outlet relief valve 140 is defined by at least a portion of the inlet relief valve 142. More particularly, an umbrella-shaped portion of the inlet relief valve 142 that extends over the inlet opening 116 forms at least a portion of the facing surface 141 of the plug 144. However, in some other embodiments a portion of the inlet relief valve 142 does not form a portion of the facing surface 141 of the outlet relief valve 140.

In the current example the plug 144 of the outlet relief valve 140 has a valve sealing surface 148 that is configured to form a seal with the vent housing 110 about the outlet opening 114. The valve sealing surface 148 can be formed by a sealing ring retained about the plug 144 that is configured to directly contact the vent housing 110 about the outlet opening 114. It will be appreciated that the outlet relief valve 140 can have a variety of alternate configurations. In some embodiments a sealing ring can be coupled to the vent housing 110 about the outlet opening 114 that the plug sealing surface is configured to come into contact with about the outlet opening 114. In some embodiments the plug 144 is constructed of an elastomeric material so a separate seal component need not be used between the plug 144 and the vent housing 110 about the outlet opening 114. In some embodiments the outlet relief valve 140 can be an elastomeric valve such as an umbrella-shaped valve, a duckbill valve, or another type of elastomeric valve. In some embodiments the outlet relief valve 140 is pivotable rather than linearly translatable away from the outlet opening 114.

Figure 7:
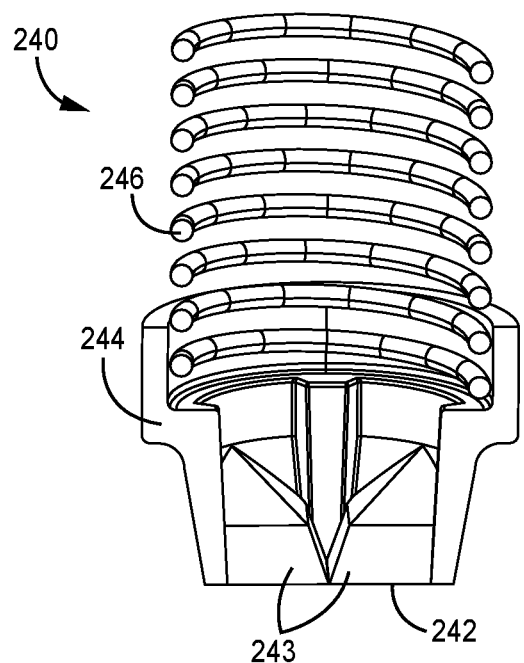
FIG. 7 is a valve assembly consistent with some embodiments.

FIG. 7 is a cross-sectional view of an alternate valve assembly 240 consistent with various embodiments. The valve assembly 240 can be used in place of the inlet relief valve and the outlet relief valve as previously described. The valve assembly 240 has an outlet relief valve that is a plug 244 coupled to a spring 246, consistent with descriptions elsewhere herein, and the valve assembly 240 functions consistently with examples discussed above. In this example, the plug 244 is constructed of an elastomeric material that forms a seal with the valve mating surface. Also, in the current example, the plug 244 also forms the inlet relief valve 242. In particular, the plug 244 is a cross-slit one-way relief valve that is the inlet relief valve 242. Opposing sealing lips 243 are biased in a closed position. Upon the first pressure differential, the sealing lips 243 separate to allow airflow from the second airflow pathway to the first airflow pathway.

Returning to a discussion of FIGS. 1-3, the filter assembly 130 is generally configured to filter contaminants from the air passing between the first airflow pathway 106 and the second airflow pathway 108. The filter assembly 130 is disposed in the vent housing 110. In various embodiments, the filter assembly 130 extends across the second airflow pathway 108. The second airflow pathway 108 extends through the filter assembly 130. The filter assembly 130 can have a variety of different configurations. However, in the current example, the filter assembly 130 has at least first filter media 131 disposed across the second airflow pathway 108 such that the first filter media 131 defines a portion of the second airflow pathway 108. The first filter media 131 can also have a variety of different configurations, but in the current example, the first filter media 131 has a tubular structure having an inner circumference 132, an outer circumference 133, a first axial end 134 and a second axial end 135. The inner circumference 132 defines an outer boundary of a central opening 136 of the filter assembly 130 in the second airflow pathway 108 of the vent 100.

The first filter media 131 is pleated in the current example. The first filter media 131 defines pleats extending from the inner circumference 132 to the outer circumference 133 such that pleat folds define the inner circumference 132 and the outer circumference 133. First pleat folds abut the central opening 136 and second pleat folds are radially outward from the first pleat folds. Pleating the first filter media 131 increases the surface area of the first filter media 131, which can increase airflow through the first filter media 131. Maximizing airflow can be desirable in implementations where the volume of fluid in a tank fluctuates rapidly. For example, in tanks used in hydraulic systems, the level of hydraulic oil in the tank can change rapidly during various operations, necessitating the rapid exchange of air between the tank and the outside environment. In some alternate configurations, the first filter media 131 can be wrapped around the central opening to define a spiral configuration. In yet another embodiment the first filter media 131 does not define a central opening.

It is noted that, in the current example where the filter assembly 130 defines the central opening, the inlet relief valve 142 and the outlet relief valve 140 are disposed in the central opening 136. Such a configuration can advantageously allow for a relatively compact vent compared to a design where the relief valve(s) are positioned outside the central opening or where no central opening is defined by the filter assembly 130 and the relief valve(s) are positioned adjacent to the filter assembly 130.

The first filter media 131 can be constructed of a variety of different types of materials and combinations of materials. The first filter media 131 can generally be configured for particle filtration. In some embodiments the first filter media 131 incorporates filter media fibers. The filter media fibers can include cellulose fibers, for example. In some embodiments the first filter media 131 incorporates polymeric fibers. The first filter media 131 can incorporate binders and/or resins among the filter media fibers, and in some other embodiments the first filter media 131 omits resinous binders. In some embodiments the first filter media 131 includes binder fibers and omits other binder materials such as binder resins. The first filter media 131 can have multiple layers include one or more layers of filter media and one or more support layers such as a scrim layer. The scrim layer can be constructed of various types of materials and combinations of materials known in the art. In one embodiment the scrim layer is polyester. The scrim layer can also be other materials and combinations of materials such as, for example, PE, PET, and polypropylene.

Various vents consistent with the current technology incorporates a second filter media 137. The second filter media 137 generally extends across second airflow pathway 108. The second filter media 137 can have alternate and/or complementary functionality to the first filter media 131. The first filter media 131 and the second filter media 137 are arranged in a series in the second airflow pathway 108. In the current example, the second filter media 137 surrounds the first filter media 131. In some alternate embodiments the first filter media 131 surrounds the second filter media 137. In some such embodiments the second filter media 137 can define the central opening of the filter assembly 130. While in the current example the second filter media 137 defines a central opening, in some other embodiments the second filter media 137 does not define a central opening.

In a variety of implementations, moisture can be released from the liquid in the tank into the air within the airspace of the tank, where "moisture" is defined as water or water vapor. The moisture can contribute to oxidation of system components, and if the moisture condenses into water droplets and falls into the liquid tank, such water droplets may interfere with the system operation. As such, in various embodiments, the second filter media 137 can be configured to aid in the removal of moisture from the tank. In some embodiments the second filter media 137 can also be configured to filter out particulates between the first airflow pathway 106 and the second airflow pathway 108. In a variety of embodiments the second filter media 137 is a hygroscopic filter media, where "hygroscopic" is defined herein as the ability to accelerate the condensation of water vapor.

In some embodiments the second filter media 137 is a regenerative hygroscopic filter media. The second filter media 137 can be configured to filter particulates and water when gas passes from the second airflow pathway 108 to the first airflow pathway 106. The second filter media 137 can be configured to release water via the second airflow pathway 108 when air passes from the first airflow pathway 106 through the second filter media 137. The second filter media 137 can be consistent with filter medias disclosed, for example, in U.S. Pat. No. 5,575,832, which is incorporated herein by reference. In at least one embodiment the second filter media 137 is a T.R.A.P. Breather Filter manufactured by Donaldson Corporation headquartered in Bloomington, Minn. Those having skill in the art will appreciate that other filter medias may also be appropriate for specific implementations of the technology disclosed herein.

The filter assembly 130 is generally configured to sealably couple to the vent housing 110 such that the second airflow pathway 108 extends through the filter media (in particular to this example, the first filter media 131 and the second filter media 137). In this particular example, the filter assembly has a first endcap 138 and a second endcap 139. The first endcap 138 is sealed to a first axial end 134 of the first filter media 131 and the second endcap 139 is sealed to a second axial end 135 of the first filter media 131. Each endcap 138, 139 has a sealing surface that is configured to form a seal with the vent housing 110. The sealing surface can be defined by a sealing ring that is compressed between each of the endcaps 138, 139 and the vent housing 110 about the central opening.

The vent housing 110 can have a variety of different configurations without departing from the scope of the technology disclosed herein. The vent housing 110 defines a filter casing that encloses the filter assembly 130. In the current example, the filter casing also encloses the inlet relief valve 142 and the outlet relief valve 140. Enclosing the filter assembly 130 can be desirable in configurations where the filter assembly 130 is constructed of one or more materials that may be negatively impacted or may cause a negative impact upon making contact with a user, components, and debris from the outside environment. The filter casing has an outer cap 160 and an inner cap 150 that are secured together.

In this example the outer cap 160 and inner cap 150 are secured with a series of interlocking snap fit structures 117, 118 (best visible in FIGS. 1-2. In particular, the outer cap 160 defines a series of openings 118, and the inner cap 150 defines a series of protrusions 117 that are configured to engage the series of openings 118 through an interference fit. In various embodiments the outer cap 160 and the inner cap 150 are secured in a non-releasable manner, meaning that the connection between the outer cap 160 and the inner cap 150 cannot be mechanically reversed without causing damage to one or both of the outer cap 160 and the inner cap 150. The outer cap 160 and the inner cap 150 can be coupled through alternate approaches such as a press fit, screw fit, frictional fit, weld, adhesive, and the like.

The outer cap 160 is generally configured to shield the filter assembly 130 from the outside environment. The outer cap 160 has a lateral sidewall 162 that extends laterally across the second axial end 104 of the filter assembly 130 and a circumferential sidewall 164 that extends circumferentially around the filter assembly 130 and circumferentially around the second airflow pathway 108. The circumferential sidewall 164 extends from the lateral sidewall 162 towards the first axial end 102 of the vent housing 110 in the axial direction. The outer cap 160 is also generally configured to receive the filter assembly 130. In particular, the outer cap 160 sealably receives the sealing surface of the second endcap 139 of the filter assembly 130. In the current example, the outer cap 160 has an outer axial baffle 168 that extends axially towards the first axial end 102 of the vent housing from the lateral sidewall 162. The outer axial baffle 168 can be configured to obstruct liquid in the outside environment from splashing onto the filter assembly 130. In some embodiments, the outer axial baffle 168 can also be configured to abut the second axial end 135 of the filter assembly 130 to maintain the position of the filter assembly 130.

In the current example, the outer cap 160 is coupled to the second end of the spring 146 of the outlet relief valve 140. The outer cap 160 can further be configured to couple to a liquid tank. In particular, the outer cap 160 can define a bayonet coupler 166 (visible in FIG. 3) that is configured to receive a mating bayonet connector that is fixed to the liquid tank. In the current example, the bayonet coupler 166 is a series of tabs that extend radially into the second airflow pathway 108. In some other embodiments, the bayonet coupler 166 can be a series of tabs that extend radially outward from the outer cap 160.

The inner cap 150 is generally configured to receive the filter assembly 130. The inner cap 150 has an annular sidewall 152 that extends laterally across the first axial end 134 of the filter assembly 130. The annular sidewall 152 extends radially outward from the central opening 136 of the filter assembly 130 beyond the second filter media 137. The inner cap 150 sealably receives the sealing surface of the first endcap 138 of the filter assembly 130. The annular sidewall 152 forms a seal with the filter assembly 130 about the central opening 136. In the current example, an inner axial flange 151 and an outer axial flange 153 abuts the inner perimeter and the outer perimeter of the filter assembly 130, respectively. The inner axial flange 151 and the outer axial flange 153 can be configured to maintain the position of the filter assembly 130 relative to the inner cap 150. The inner axial flange 151 extends circumferentially around the central opening 136 of the filter assembly 130. The outer axial flange 153 can extend circumferentially around the filter assembly 130.

In some embodiments, the outer axial flange 153 can also be configured to obstruct liquid in the outside environment from splashing onto the filter assembly 130. The outer axial flange 153 is positioned radially inwardly relative to the snap fit structures 117, 118. The outer axial flange 153 has a circumferential length that extends around the filter assembly 130. The outer axial flange 153 is positioned radially inward from the snap fit structures 117, 118. The outer axial flange 153 can have first circumferential sections 153a that are each in radial alignment with a corresponding interlocking snap fit structures 117, 118 and second circumferential sections 153b that are outside of radial alignment with each of the snap fit structures 117, 118. The first circumferential sections 153a have a greater axial length than the second circumferential sections 153b of the outer axial flange 153 (visible in FIG. 4). In various embodiments, including those currently depicted, the first circumferential sections 153a of the outer axial flange 153 each have a circumferential length Lc (such as a radial arc) that is greater than the circumferential length of the corresponding snap fit structure 117,118. Such a configuration may advantageously prevent liquid from entering the vent housing 110 through the openings 118 to make contact with the filter assembly 130.

Figure 14:
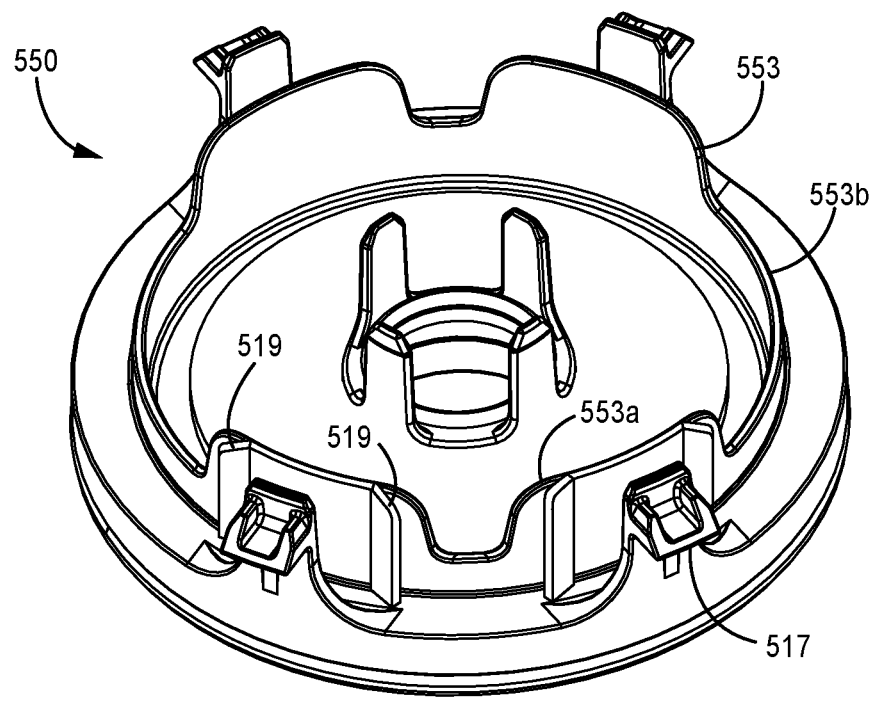
FIG. 14 shows a perspective view of an alternate example of a vent component consistent with the technology disclosed herein.

In examples, the first circumferential segments 153a of the outer axial flange 153 can have one or more projections to further obstruct liquid, such as splashing liquid, from entering the vent housing 110. Such an example is depicted in FIG. 14, which is a perspective view of an alternate design of an inner cap 550 consistent with the technology disclosed herein. The inner cap 550 is generally consistent with inner caps discussed elsewhere herein unless contradictory to the current description. Similar to the discussion above, the inner cap 550 has an outer axial flange 553 that extends circumferentially around the filter cavity. The outer axial flange 553 is positioned radially inward from the snap fit structure 517. The outer axial flange 553 has first circumferential segments 553a that are radially aligned with a corresponding snap fit structure 517 and second circumferential segments 553b that are not radially aligned with any snap fit structures 517. In this example, each of the first circumferential segments 553a has a pair of projections 519 positioned laterally outward from the corresponding snap fit structure 517. The projections 519 taper outward from the first circumferential segment 553a. Such a configuration may advantageously obstruct the entry of splashing liquid to the filter housing. The projections can have alternate configurations, as well.

Returning back to the examples depicted in FIGS. 1-4, the inner cap 150 defines the valve opening 114 and the valve seat 115 surrounding the valve opening 114. The valve seat 115 is configured to receive the valve sealing surface 148 of the outlet relief valve 140. The inner cap 150 can further be configured to couple to a liquid tank. In particular, the inner cap 150 has a sealing flange 154 that has a seal 155 coupled thereto. The sealing flange 154 is a component of the mounting structure 120. The sealing flange 154 extends axially towards the first axial end 102 of the vent housing 110 about the first airflow pathway 106. The sealing flange 154 is configured to be sealingly coupled to a liquid tank about a tank opening. In the current example the seal 155 is a radial seal, but in other examples the seal can be an axial seal. Furthermore, in the current example the seal 154 is positioned towards a proximal end of the sealing flange 154 but in some other embodiments the seal 154 can be positioned towards the opposite, distal end of the sealing flange 154. "Proximal" is used herein to refer to a component configured to be situated further within the interior volume of a liquid tank, and "distal" is used herein to refer to a component configured to be situated further from the interior volume of a liquid tank.

The inner cap 150 defines the first axial end 102 of the vent 100. In particular, the inner cap 150 extends from the valve seat 115 towards the first axial end 102 of the vent housing 110. The first axial end 102 of the vent is configured to be received by a volume of the liquid tank to which the vent is mounted. The first opening 111 (particularly visible in FIGS. 2-4) of the vent housing 110 is configured to be in direct fluid communication with the interior of the liquid tank. In the current example, the first opening 111 is a series of discrete openings defined by the vent housing 110 around the central opening 136. The first opening 111 is a series of discrete openings defined by the vent housing 110 around the central axis x. In the current example, the first opening 111 is perpendicular to the axial direction of vent 100. The first opening 111 is positioned between the first axial end 102 and the second axial end 104. In various embodiments, the first opening 111 is not defined on the first axial end 102 of the vent 100. The first opening 111 may advantageously limit splashing of liquid from the liquid tank into the first opening 111. In some other examples the first opening 111 is parallel to the axial direction of the vent 100 and is configured to face an adjacent surface of a liquid tank (rather than the tank volume) upon installation of the vent 100 onto the liquid tank.

The first airflow pathway 106 extends from the first opening 111 to the inlet relief valve 142 (and the outlet relief valve 140). The inner cap 150 defines the first airflow pathway 106. The first airflow pathway 106 defines a tortuous path from the first opening 111 to the inlet relief valve 142 such that the airflow path is not straight. Such a configuration may advantageously limit the ability of splashing liquid within the tank volume to make contact with the inlet and outlet relief valves. In the current example, the first airflow pathway 106 has a first segment 106a extending in a first axial direction from the first opening 111 to the first axial end 102 of the vent.

The first airflow pathway 106 has a second segment 106b extending from the first airflow pathway 106 at first axial end 102 of the vent to the inlet relief valve 142. The second segment 106b extends in an opposite axial direction from the first axial direction, meaning that, in operation, there is airflow from the first airflow pathway 106 to the second airflow pathway 108 (or from the second airflow pathway to the first airflow pathway 106), the airflow in the first segment 106a is in the opposite axial direction of the airflow in the second segment 106b. The opposing axial directions of the first segment 106a and the second segment 106b may advantageously limit liquid particles from traveling from the first segment 106a through the second segment 106b to the valves. The first airflow pathway 106 defines a 180-degree turn connecting the first segment 106a and the second segment 106b. The second segment 106b extends 180-degrees from the first segment 106a. The first segment 106a and the second segment 106b are substantially parallel.

In the current example, the first airflow pathway 106 is defined from the first axial end 102 of the vent housing 110 towards the second axial end 104 of the vent housing 110. The first axial end 102 of the vent housing 110 has an outer shell 180 and an inner shell 186. The outer shell 180 defines the first axial end 102 of the vent housing 110 and the outer shell 180 extends axially towards the second axial end 104 of the vent housing 110. The outer shell 180 forms an outer lateral boundary about the first segment 106a of the first airflow pathway 106. The inner shell 186 defines a shell opening 187. The inner shell 186 forms an inner lateral boundary about the first segment 106a and an outer lateral boundary of the second segment 106b of the first airflow pathway 106. The inner shell 186 is disposed between the first segment 106a and the second segment 106b in the radial direction. The vertical orientation of the outer lateral boundary of the first segment 106a, the inner lateral boundary of the first segment 106a, and/or the outer lateral body of the second segment 106b may advantageously direct collected liquid down towards a draining pathway to return the liquid to the liquid tank using gravity.

In some embodiments, the first segment 106a and the second segment 106b are defined about a central axial axis x (see FIG. 3) of the vent housing 110. In the current example, the first segment 106a and the second segment 106b are concentric along at least a portion of the first airflow pathway 106.

In some embodiments the outer shell 180 and the annular sidewall 152 are a single, unitary component. However, examples consistent with the current embodiment, the outer shell 180 and the annular sidewall 152 are separate components that are coupled. The outer shell 180 and the annular sidewall 152 define a snap fit structure, although they can define other types of connections, as well. In particular, here the outer shell 180 has a distal end defining plurality of engagement tabs 182 (visible in FIGS. 4 and 5). A connector 181 extends axially away from the annular sidewall 152 towards the first axial end 102 of the vent housing 110. The connector 181 defines a plurality of tab retaining openings 183 that are each configured to retain an engagement tab 182 via an interference fit. Other types of connections are also contemplated including a screw fit, bayonet connector, compression fit, and the like.

In the current example, the inner shell 186 has a radial rim 188 (visible in FIGS. 2-3) on one end that extends radially outward from a main portion of the inner shell 186. The radial rim 188 is retained between the distal end of the outer shell 180 and the connector 181 in the axial direction. The radial rim 188 is not positioned between the engagement tabs 182 and the tab retaining openings 183, however. Further, in some implementations it may be possible for liquid to splash between the engagement tabs 182 and the tab retaining openings 183. The vent housing 110 may advantageously be designed to obstruct such liquid intrusion. In particular, the inner shell 186 can define one or more barrier walls 189 (visible in FIG. 4) that radially align with the engagement tabs 182 and the tab retaining openings 183. The barrier walls 189 can extend axially and laterally around the openings between the engagement tabs 182 and the tab retaining openings 183 to serve as a physical obstruction to splashing liquid.

Figure 6:
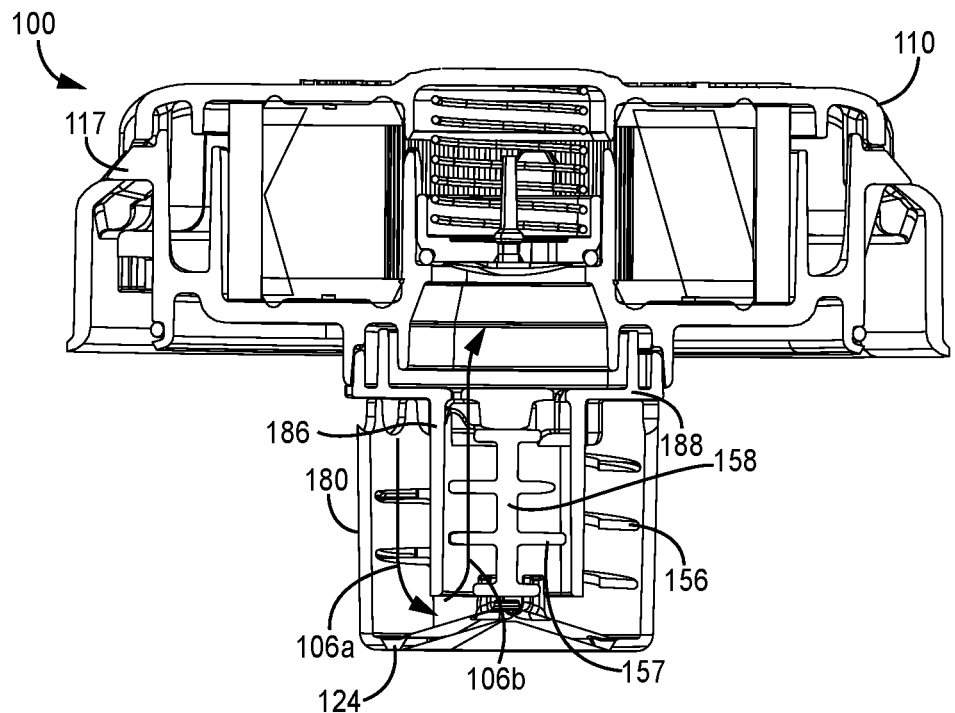
FIG. 6 is yet another cross-sectional view of an example vent generally consistent with FIG. 3.

It is noted that in the embodiment depicted in FIGS. 5 and 6, the first segment 106a of the first airflow pathway 106 additionally has an axial obstruction feature 156 that extends laterally across the first airflow pathway 106. The axial obstruction feature 156 can be a radial ridge that forms a spiral along the axial length of the first segment 106a of the first airflow pathway 106. In this example the axial obstruction feature 156 is a ridge that extends radially outward from the inner shell 186 towards the outer shell 180, but in some other examples the axial obstruction feature 156 can be a ridge that extends radially inward from the outer shell towards the inner shell 186. In the current example, the axial obstruction feature extends a radial distance that is less than the radial distance between the outer shell 180 and the inner shell 186. Such an obstruction feature 156 can provide further splash protection.

Additionally or alternatively, as depicted in FIG. 6, an axial blocking feature 157 can be disposed across the second segment 106b of the first airflow pathway 106. The axial blocking feature 157 is configured to provide a physical obstruction to liquid splashing in the axial direction through the second segment 106b, but still allows airflow along the airflow pathway. The axial blocking feature 157 can be a ramped radial ridge spiraling axially through the second segment 106b, similar to the axial obstruction feature 156 described above. Or, as depicted in the current example, the axial blocking feature 157 is a series of rings extending radially outward from a central axial core 158, where the central axial core 158 extends axially through the inner shell 186. In various implementations of the current technology an axial obstruction feature 156 and/or the axial blocking feature 157 can be omitted, which may advantageously reduce the pressure drop across the vent 100.

The first axial end 102 of the vent 100 defines drain openings 124 extending axially through the first axial end 102 of the vent. The drain openings 124 define a draining pathway extending from the first airflow pathway 106 through the first axial end 102 of the vent housing 110. The draining pathway and the drain openings 124 can allow for gravity-assisted drainage of liquid in the first airflow pathway 106. As such, in various embodiments, the first axial end 102 of the vent housing 110 is configured to be positioned vertically below the second axial end 104 of the vent housing 110. In the current example, the drain openings 124 are spaced radially outward from the second segment 106b of the first airflow pathway 106 to limit liquid from splashing into the second segment 106b of the first airflow pathway 106 through the drain openings 124. A ramped surface 125 extends towards the drain openings 124 to direct liquid flow towards the drain openings 124.

As mentioned above, the second opening 112 of the vent housing 110 is configured to be in direct fluid communication with the external environment of the liquid tank. The second opening 112 is defined between the outer cap 160 and the inner cap 150. The second opening 112 is defined between the first axial end 102 and the second axial end 104 of the vent housing 110. In the current example, the second opening 112 forms an annulus extending around the central axis x and/or the central opening. The second opening 112 generally faces the first axial end 102 of the vent housing 110 and, upon installation of the vent to a liquid tank, the second opening 112 is configured to face an outer surface of the liquid tank. Such a configuration may advantageously obstruct debris such as water in the outside environment from directly entering the second airflow pathway 108 through the second opening 112. The outer cap 160 forms a barrier circumferentially around the second airflow pathway 108 and laterally across the second airflow pathway 108 to obstruct outside debris from directly entering the second airflow pathway 108.

At least a portion of the second airflow pathway 108 is configured to be tortuous such that the fluid path from the second opening 112 to the filter assembly 130 is not straight. Such a configuration may advantageously prevent splashing liquids from in the outside environment from making contact with the filter assembly 130. Indeed, in the current example, the second airflow pathway 108 extends from the second opening 112 in the axial direction towards the second axial end 104 of the vent and then in the radial direction towards and through the filter assembly 130. In various embodiments, the second airflow pathway 108 defines at least an axially extending segment 108a and a radially extending segment 108b (depicted in FIG. 5).

Figure 8:
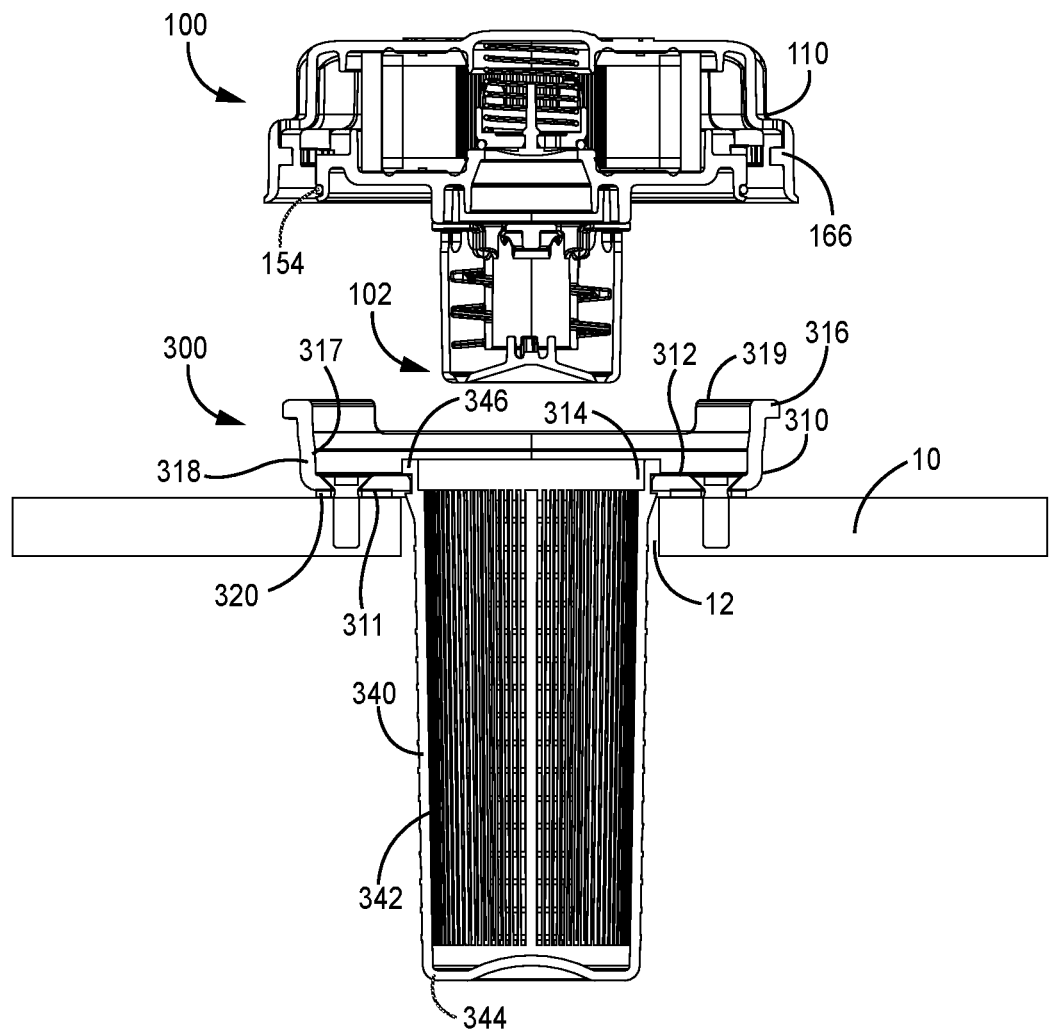
FIG. 8 is an exploded cross-sectional view of an example implementation of the current technology.
Figure 9:
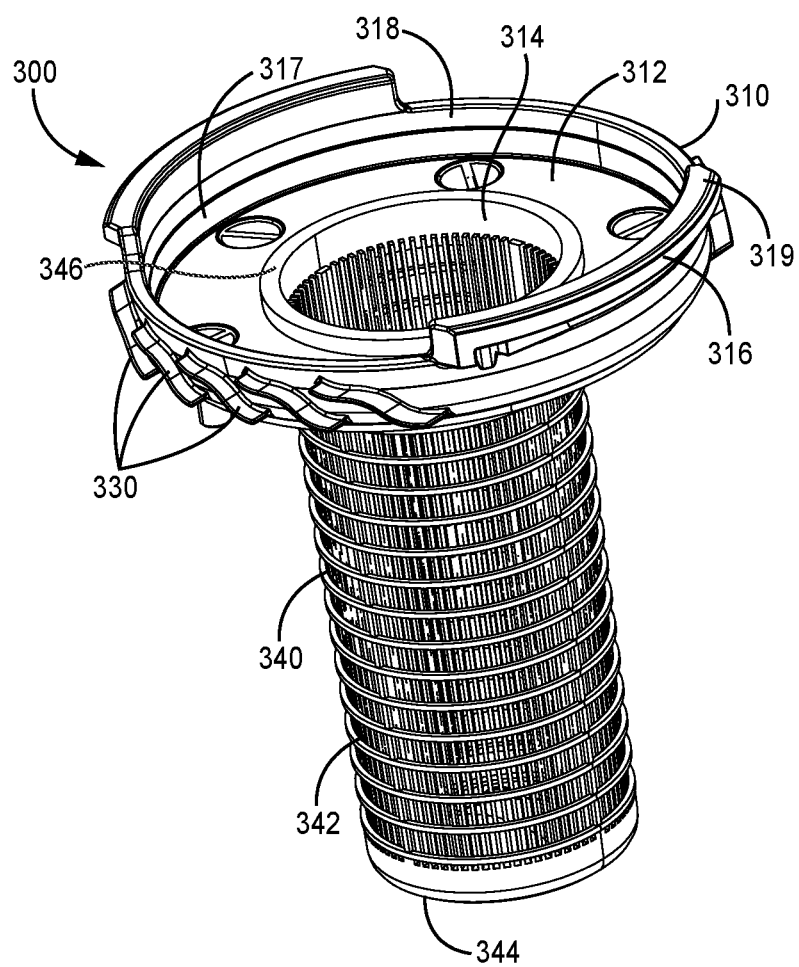
FIG. 9 is a perspective view of an example tank interface consistent with embodiments.

In various embodiments a tank interface 300 assembly can be used to sealably couple the vent to the tank. FIG. 8 depicts a cross-sectional exploded view of an example implementation of a vent system and a portion of a liquid tank. FIG. 9 depicts a perspective view of a tank interface 300 consistent with FIG. 8. The tank interface 300 is generally configured to be fixed to a liquid tank 10 in a sealed relationship about a tank opening 12. The tank interface 300 is configured to seal to a vent 100 such that the vent 100 is sealed to the liquid tank 10. The tank interface 300 is generally configured to be used in conjunction with vents described herein.

The tank interface 300 generally has a vent mount 310. The vent mount 310 is configured to be fixed to a liquid tank. In particular, the vent mount 310 defines an annular body 312 defining an annular outer surface 311 that is configured to be sealed to the tank 10 about a tank opening 12. A seal 320 is disposed between the annular outer surface 311 and the tank 10 about the tank opening 12. The vent mount 310 defines a mount opening 314 and a mating structure 316. The mount opening 314 is configured to substantially align with the tank opening 12. The mount opening 314 and the tank opening 12 are configured to receive the first axial end 102 of the vent 100 upon installation of the vent 100.

Figure 10:
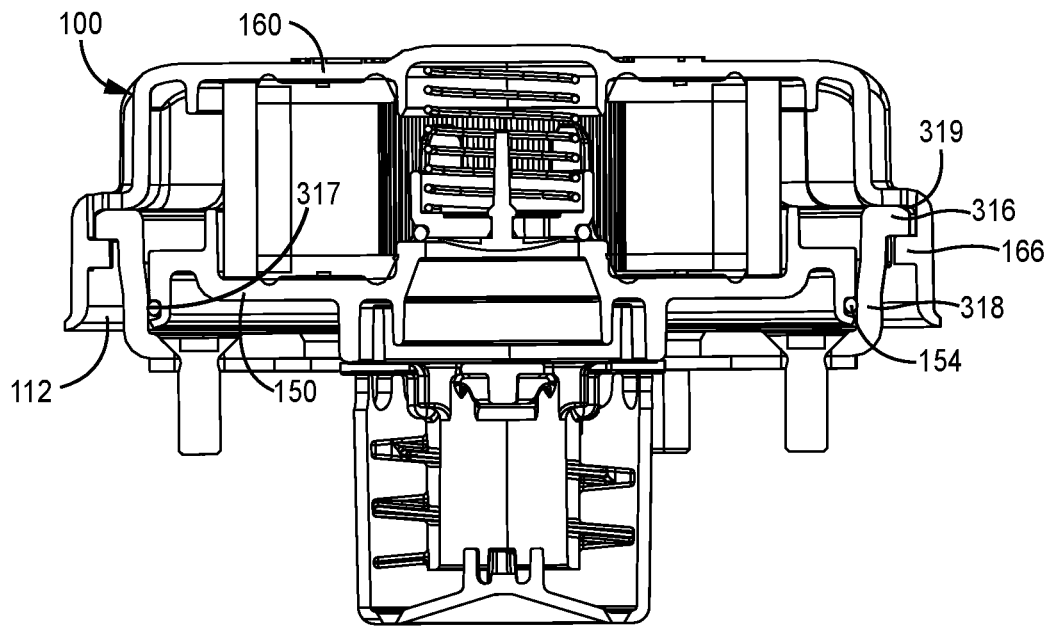
FIG. 10 is a cross-sectional view of an example system consistent with some embodiments.

The mating structure 316 of the vent mount 310 is configured to sealably mate with the mounting structure 120 of the vent 100 around the vent housing 110. In this example that is consistent with the vents depicted herein, the mating structure 316 includes a bayonet connector 316 that is configured to reversibly receive the bayonet coupler 166 of the vent. In the current example, the mating structure 316 has two bayonet connectors 316. In some other embodiments additional bayonet connectors 316 can be included. The tank interface 300 has a circumferential wall 318 extending axially outward from the annular body 312. The distal end 319 of the circumferential wall 318 defines the bayonet connectors 316. To couple the vent 100 to the vent mount 310, the first axial end 102 of the vent is inserted through the mount opening 314 and the bayonet couplers 166 are brought into axial alignment with the bayonet connectors, and the vent 100 is rotated relative to the vent mount 310 such that the bayonet couplers 166 and bayonet connectors 316 mutually engage. Consistently with examples described herein, to bring the bayonet couplers 166 and bayonet connectors 316 into axial alignment, the distal end 319 of the circumferential wall 318 is inserted into the first airflow pathway 106 between the outer cap 160 and the inner cap 150. Such a connection is shown in FIG. 10, which is a cross-sectional view of an example vent 100 installed in the example vent mount 310 of FIG. 8.

The mating structure 316 of the vent mount 310 also has a vent sealing surface 317. The vent sealing surface 317 is configured to sealingly engage a surface of the vent 100 around the vent housing 110. In particular, the vent sealing surface 317 can be configured to fluidly separate the first opening 111 and the second opening 112 outside of the vent 100. In the current example, the vent sealing surface 317 is configured to seal against the sealing flange 154 (discussed above, see FIG. 3, for example), which is visible in FIGS. 8 and 10. The vent sealing surface 317 can be configured to seal against the sealing flange 154 around the inner cap 150 of the vent housing 110, in some embodiments. In this example, the vent sealing surface 317 is an inner radial surface defined by the circumferential wall 318 of the vent mount 310. In some other embodiments the vent sealing surface 317 can be an axial surface where the sealing flange supports an axial seal.

The mating structure 316 of the vent mount 310 and the mounting structure 120 of the vent 100 can have alternate configurations. In some examples the mating structure (316) and the mounting structure (120) can have a frictional fit or an interference fit. In some embodiments the mating structure and the mounting structure form a snap fit connection. In some embodiments the mating structure and the mounting structure have a threaded connection. For example, the sealing flange 154 can define outer circumferential threads that are configured to engage mating inner circumferential threads defined by the vent sealing surface 317 of the vent mount 310. As another example the outer cap 160 can define inner circumferential threads that are configuration to engage mating outer circumferential threads defined by the outer circumferential wall 318 of the vent mount 310. In such an example, the inner circumferential threads and outer circumferential threads can define gaps that accommodate airflow. Such gaps can define a portion of the second airflow pathway 108.

Figure 11:
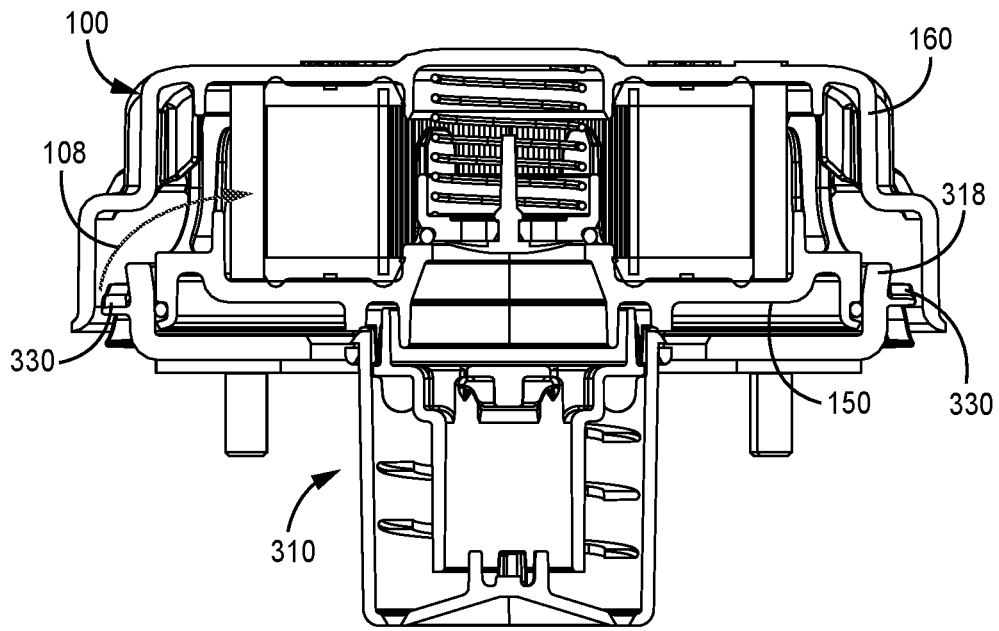
FIG. 11 is a second cross-sectional view of an example system consistent with FIG. 9.

In various embodiments the vent mount 310 can incorporate structural features that help prevent entry to debris, such as spraying liquid, in the vent. For example, as visible in FIG. 9, the vent mount 310 incorporates a series of radially extending deflectors 330. The radially extending deflectors 330 are disposed along the outer surface of the circumferential wall 318. The deflectors 330 extend radially outward from the outer surface of the circumferential wall 318. The deflectors 330 are configured to partially obstruct the second opening 112 across the axial direction. The configuration of the deflectors 330 across the second airflow pathway 108 is visible in FIG. 11, which is another cross-sectional view of the system of FIG. 10 through a second cross section. The inner surface of the circumferential wall 318 is in sealing engagement with the sealing flange of the inner cap 150, and the circumferential wall 318 extends a portion of the distance of the radial gap between the inner cap 150 and the outer cap 160. The deflectors 330 extend from the outer surface of the circumferential wall 318 across a further portion of the distance of the radial gap between the inner cap 150 and the outer cap 160 across the second airflow pathway 108.

The series of deflectors 330 are positioned circumferentially about the vent mount 310 between the bayonet connectors 316. As is visible in FIG. 10, the bayonet connectors 316 and bayonet couplers 166 form a physical obstruction laterally across the second airflow pathway 108. As such, in some embodiments the outer circumferential surface of the vent mount 310 may lack radial deflectors 330 along portions of the circumferential wall 318 that are in axial alignment with a bayonet connector 316. In some other embodiments such deflectors 330 can be spaced across the entire outer circumferential surface of the circumferential wall 318.

Figure 12:
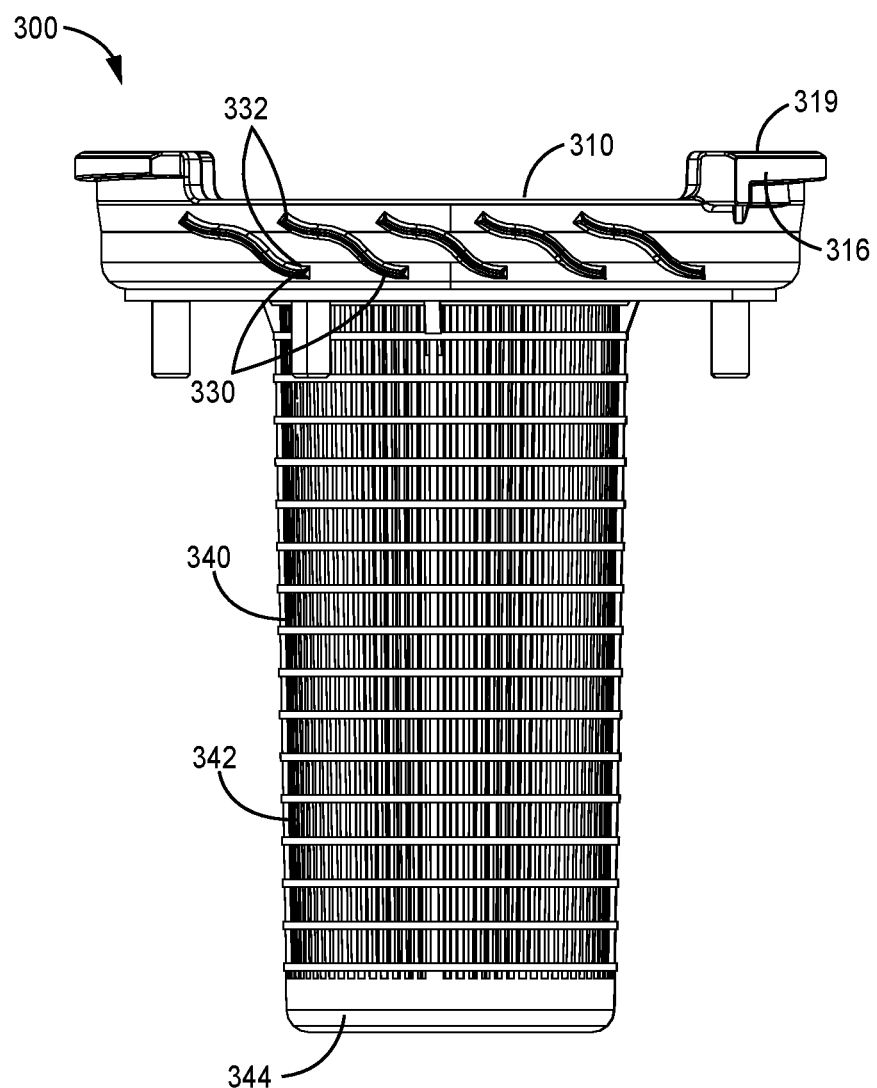
FIG. 12 is a facing view of the example tank interface of FIG. 9.

FIG. 12 depicts a facing view of a portion of the radial deflectors 330 on the vent mount 310. In the current example, each deflector 330 extends diagonally across the outer radial surface of the vent mount 310. The diagonal orientation can contribute to the gravity assisted drainage of liquid out of the second airflow pathway 108 through the second opening 112. Furthermore, in the current example, each end 332 of each radially extending deflector 330 is axially aligned with an end 332 of each adjacent radially extending deflector 330. The first and last radially extending deflectors 330 in the series each have an end 332 that is in axial alignment with the bayonet connector 316. As such, the combination of the deflectors 330 and the bayonet connectors 316 form a substantially continuous obstruction in the second airflow pathway 108 about the vent housing 110. Such a configuration may advantageously obstruct entrance of liquid into the second airflow pathway 108 while accommodating airflow.

FIGS. 8, 9 and 12 depict an example tank interface 300 having an optional strainer 340 feature. The strainer 340 is generally configured to be installed in a tank opening in implementations where the tank opening can be used as a fill port for filling the tank with liquid, such as hydraulic fluid. In such implementations the strainer 340 can be configured to filter out relatively large contaminants such as particulates, broken components, and the like. The strainer 340 is also configured to surround the first axial end 102 of the vent 100. The strainer 340 generally has a strainer body 342 formed from a material such as a plastic mesh, wire mesh or filtration media. The strainer body 342 extends in the axial direction and defines an axial end 344 (the proximal end). As such, liquid that passes through the tank opening necessarily passes through the strainer body 342. Along the axial length of the strainer body 342, the strainer body 342 has a maximum lateral dimension (perpendicular to the axial direction) that is less than the diameter of the mount opening 314. The lateral dimension can be a diameter, for example. As such, the strainer body 342 can be inserted through the mount opening 314.

The strainer 340 is disposed in the mount opening 314. The strainer 340 has retaining flange 346 that extends radially outwardly from one end (the distal end) of the strainer body 342. The retaining flange 346 has an outer lateral dimension, such as a diameter or diagonal measurement, that exceeds the diameter of the mount opening 314. As such, the retaining flange 346 rests on a facing surface of the annular body 312. The strainer 340 is configured to extend from the vent mount 310 into the liquid tank in the axial direction. The strainer 340 is configured to receive the first axial end 102 of the vent 100. In various implementations, the strainer 340 can be omitted, such as depicted in FIGS. 9 and 10.

Statement of the Embodiments

Embodiment 1. A vent comprising:
a vent housing defining a mounting structure, a first end, a second end, a first opening between the first end and the second end, a first airflow pathway extending from the first opening, a second opening, a second airflow pathway extending from the second opening, and a draining pathway extending from the first airflow pathway through the first end of the vent housing, wherein the first airflow pathway has a first segment extending in a first axial direction and a second segment extending in an opposite axial direction from the first axial direction;
an inlet relief valve coupled to the housing between the first airflow pathway and the second airflow pathway, wherein the inlet relief valve is biased in a closed position and is configured to open upon a pressure differential of the second airflow pathway relative to the first airflow pathway exceeding a first threshold pressure;
an outlet relief valve coupled to the housing between the first airflow pathway and the second airflow pathway, wherein the outlet relief valve is biased in a closed position, wherein the outlet relief valve is arranged in parallel with the inlet relief valve and wherein the outlet relief valve is configured to open upon a pressure differential of the first airflow pathway relative to the second airflow pathway exceeding a second threshold pressure; and a filter assembly disposed in the vent housing, wherein the filter assembly extends across the second airflow pathway.

Embodiment 2. The vent of any one of embodiments 1 and 3-20, wherein the mounting structure defines a bayonet coupler that is configured to couple to a mating bayonet connector.

Embodiment 3. The vent of any one of embodiments 1-2 and 4-20, the vent housing defining a first end and a second end, wherein the filter assembly is towards the second end.

Embodiment 4. The vent of any one of embodiments 1-3 and 5-20, wherein the inlet relief valve and the outlet relief valve are integrated in a single component.

Embodiment 5. The vent of any one of embodiments 1-4 and 6-20, wherein the inlet relief valve comprises an elastomeric cross-slit valve.

Embodiment 6. The vent of any one of embodiments 1-5 and 7-20, wherein the inlet relief valve comprises an elastomeric valve having a displaceable sealing lip sealably surrounding an inlet opening.

Embodiment 7. The vent of any one of embodiments 1-6 and 8-20, wherein the outlet relief valve comprises:
 a plug sealably disposed across an outlet opening; and
 a spring compressibly disposed between the plug and the vent housing, wherein the plug is translatable away from the outlet opening.

Embodiment 8. The vent of any one of embodiments 1-7 and 9-20, wherein the outlet opening surrounds the inlet opening.

Embodiment 9. The vent of any one of embodiments 1-8 and 10-20, wherein the inlet relief valve is directly coupled to the outlet relief valve.

Embodiment 10. The vent of any one of embodiments 1-9 and 11-20, further comprising a filter casing surrounding the filter assembly, the filter casing comprising an outer cap and an inner cap, wherein the outer cap and the inner cap are secured around the filter assembly.

Embodiment 11. The vent of any one of embodiments 1-10 and 12-20, wherein the outer cap defines the mounting structure.

Embodiment 12. The vent of any one of embodiments 1-11 and 13-20, wherein the outer cap and the inner cap form a snap fit connection around the filter assembly.

Embodiment 13. The vent of any one of embodiments 1-12 and 14-20, wherein the second opening is defined between the outer cap and the inner cap.

Embodiment 14. The vent of any one of embodiments 1-13 and 15-20, wherein the inlet relief valve and the outlet relief valve are disposed between the inner cap and the outer cap.

Embodiment 15. The vent of any one of embodiments 1-14 and 16-20, wherein the inner cap defines the first opening and the first airflow pathway.

Embodiment 16. The vent of any one of embodiments 1-15 and 17-20, wherein the first airflow pathway defines a tortuous path from the first opening towards the inlet relief valve.

Embodiment 17. The vent of any one of embodiments 1-16 and 18-20, wherein the filter assembly comprises first filter media surrounding a central opening and the inlet relief valve and the outlet relief valve are disposed in the central opening.

Embodiment 18. The vent of any one of embodiments 1-17 and 19-20, wherein the first filter media comprises pleated filter media having first pleat folds abutting the central opening and second pleat folds radially outward from the first pleat folds.

Embodiment 19. The vent of any one of embodiments 1-18 and 20, further comprising a second filter media surrounding the first filter media, wherein the first filter media and the second filter media are arranged in a series in the second airflow pathway.

Embodiment 20. The vent of any one of embodiments 1-19, configured to be sealably received by a hydraulic tank about a fill port.

Embodiment 21. A vent system comprising:
 the vent of any one of embodiments 1-20; and
 a tank interface comprising:
  a vent mount configured to be fixed to a liquid tank, the vent mount defining a mount opening and the vent mount comprising a mating structure configured to sealably mate with the mounting structure of the vent around the housing.

Embodiment 22. The vent system of any one of embodiments 21 and 23-26, further comprising a strainer disposed in the mount opening, the strainer configured to extend from the vent mount into the liquid tank in the axial direction, wherein the strainer is configured to receive the first end of the vent.

Embodiment 23. The vent system of any one of embodiments 21-22 and 24-26, wherein the mating structure comprises a bayonet connector.

Embodiment 24. The vent system of any one of embodiments 21-23 and 25-26, wherein the mating structure comprises a vent sealing surface.

Embodiment 25. The vent system of any one of embodiments 21-24 and 26, wherein the vent mount further comprising a plurality of radially extending deflectors that are configured to partially obstruct the second airflow pathway.

Embodiment 26. The vent system of any one of embodiments 21-25, wherein the radially extending deflectors extend radially outward from an outer radial surface of the vent mount.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A vent comprising:
   a vent housing defining a mounting structure, a first axial end, a second axial end, a first opening between the first axial end and the second axial end, a first airflow pathway extending from the first opening, a second opening, a second airflow pathway extending from the second opening, and a draining pathway extending from the first airflow pathway through the first axial end of the vent housing, wherein the first airflow pathway has a first segment extending in a first axial direction and a second segment extending in an opposite axial direction from the first axial direction;
   an inlet relief valve coupled to the housing between the first airflow pathway and the second airflow pathway, wherein the inlet relief valve is biased in a closed position and is configured to open upon a pressure differential of the second airflow pathway relative to the first airflow pathway exceeding a first threshold pressure, wherein the second segment extends from the first segment to the inlet relief valve;
   an outlet relief valve coupled to the housing between the first airflow pathway and the second airflow pathway, wherein the outlet relief valve is biased in a closed position, wherein the outlet relief valve is arranged in parallel with the inlet relief valve and wherein the outlet relief valve is configured to open upon a pressure differential of the first airflow pathway relative to the second airflow pathway exceeding a second threshold pressure; and
   a filter assembly disposed in the vent housing, wherein the filter assembly extends across the second airflow pathway.

2. The vent of claim 1, wherein the mounting structure defines a bayonet coupler that is configured to couple to a mating bayonet connector.

3. The vent of claim 1, wherein the filter assembly is towards the second axial end.

4. The vent of claim 1, wherein the inlet relief valve and the outlet relief valve are integrated in a single component.

5. The vent of claim 1, wherein the inlet relief valve comprises an elastomeric cross-slit valve.

6. The vent of claim 1, wherein the inlet relief valve comprises an elastomeric valve having a displaceable sealing lip sealably surrounding an inlet opening.

7. The vent of claim 6, wherein the outlet relief valve comprises:
   a plug sealably disposed across an outlet opening; and
   a spring compressibly disposed between the plug and the vent housing, wherein the plug is translatable away from the outlet opening.

8. The vent of claim 1, wherein the inlet relief valve is directly coupled to the outlet relief valve.

9. The vent of claim 1, further comprising a filter casing surrounding the filter assembly, the filter casing comprising an outer cap and an inner cap, wherein the outer cap and the inner cap are secured around the filter assembly.

10. The vent of claim 9, wherein the outer cap and the inner cap form a snap fit connection around the filter assembly.

11. The vent of claim 9, wherein the second opening is defined between the outer cap and the inner cap.

12. The vent of claim 9, wherein the inlet relief valve and the outlet relief valve are disposed between the inner cap and the outer cap.

13. The vent of claim 1, wherein the first airflow pathway defines a tortuous path from the first opening towards the inlet relief valve.

14. The vent of claim 1, wherein the filter assembly comprises first filter media surrounding a central opening and the inlet relief valve and the outlet relief valve are disposed in the central opening.

15. The vent of claim 14, wherein the first filter media comprises pleated filter media having first pleat folds abutting the central opening and second pleat folds radially outward from the first pleat folds.

16. The vent of claim 14, further comprising a second filter media surrounding the first filter media, wherein the first filter media and the second filter media are arranged in a series in the second airflow pathway.

17. A vent system comprising:
   the vent of claim 1; and
   a tank interface comprising:
      a vent mount configured to be fixed to a liquid tank, the vent mount defining a mount opening and the vent mount comprising a mating structure configured to sealably mate with the mounting structure of the vent around the housing.

18. The vent system of claim 17, further comprising a strainer disposed in the mount opening, the strainer configured to extend from the vent mount into the liquid tank in the axial direction, wherein the strainer is configured to receive the first axial end of the vent.

19. The vent system of claim 17, wherein the vent mount further comprises a plurality of radially extending deflectors that are configured to partially obstruct the second airflow pathway.

20. The vent system of claim 19, wherein the radially extending deflectors extend radially outward from an outer radial surface of the vent mount.

* * * * *